United States Patent
Choi et al.

(10) Patent No.: US 8,953,339 B2
(45) Date of Patent: Feb. 10, 2015

(54) POWER MODULE AND DISPLAY DEVICE

(71) Applicant: Samsung Electro-Mechanics Co., Ltd., Suwon, Gyunggi-do (KR)

(72) Inventors: Heung Gyoon Choi, Gyunggi-do (KR); Jin Woo Cho, Gyunggi-do (KR); Sung Ho Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/762,056

(22) Filed: Feb. 7, 2013

(65) Prior Publication Data
US 2013/0155350 A1  Jun. 20, 2013

Related U.S. Application Data

(62) Division of application No. 12/790,454, filed on May 28, 2010.

(30) Foreign Application Priority Data

Jun. 3, 2009  (KR) .................. 10-2009-0049200
Dec. 4, 2009  (KR) .................. 10-2009-0119906

(51) Int. Cl.
*H05K 9/00* (2006.01)
*G02F 1/1335* (2006.01)
*G02F 1/1345* (2006.01)
*G02F 1/1333* (2006.01)

(52) U.S. Cl.
CPC ...... *G02F 1/133602* (2013.01); *G02F 1/13452* (2013.01); *G02F 2001/133334* (2013.01)
USPC ............ 361/816; 361/800; 361/818; 361/807

(58) Field of Classification Search
CPC ..... H05K 9/0022; H05K 9/0024; H05K 9/00; H05K 9/0032; H05K 9/0052; H05K 9/003; H05K 9/002; H05K 9/0026; H05K 9/0028; H05K 9/0035; H05K 9/0033; G02F 2001/133334; H01L 2225/06537
USPC ............................................. 349/59; 174/350
See application file for complete search history.

(56) References Cited

U.S. PATENT DOCUMENTS

| | | | | |
|---|---|---|---|---|
| 4,503,485 A | * | 3/1985 | Geissler | 361/816 |
| 5,508,889 A | * | 4/1996 | Ii | 361/816 |
| 5,596,487 A | * | 1/1997 | Castaneda et al. | 361/814 |

(Continued)

OTHER PUBLICATIONS

Chinese Office Action issued in corresponding Chinese Application No. 2010-10196329.1, dated Apr. 9, 2013, with English translation.

*Primary Examiner* — Tuan T Dinh
*Assistant Examiner* — Steven T Sawyer
(74) *Attorney, Agent, or Firm* — Lowe Hauptman & Ham LLP

(57) ABSTRACT

There are provided a power module and a display device. There is provided the power module for a display device that includes a panel, a backlight unit supporting the panel and including a light source, and a conductive back cover coupled to the backlight unit, the power module including: a circuit board supplying power to the light source included in the backlight unit; a transformer mounted on the circuit board and supplying power to the circuit board; and a shielding plate mounted on the circuit board and covering, in a non-contact manner, the upper surface of the transformer opposed to the lower surface 401 of the transformer facing the surface of the circuit board. There is provided a display device including such a power module.

32 Claims, 11 Drawing Sheets

(56) References Cited

U.S. PATENT DOCUMENTS

| | | | |
|---|---|---|---|
| 5,880,937 A * | 3/1999 | Schadhauser et al. | 361/794 |
| 6,304,458 B1 * | 10/2001 | Mendolia | 361/814 |
| 6,420,649 B1 * | 7/2002 | Kahl et al. | 174/377 |
| 2002/0029893 A1 * | 3/2002 | Toyoda et al. | 174/35 R |
| 2006/0272857 A1 * | 12/2006 | Arnold | 174/377 |
| 2007/0190858 A1 * | 8/2007 | Stoneham et al. | 439/607 |
| 2009/0201660 A1 * | 8/2009 | Kim | 361/818 |
| 2009/0283319 A1 * | 11/2009 | Hsieh | 174/350 |

* cited by examiner

P2 ENLARGED VIEW

POWER MODULE AND DISPLAY DEVICE

CROSS-REFERENCE TO RELATED APPLICATIONS

This application is a divisional of U.S. application Ser. No. 12/790,454, filed May 28, 2010 and claims the priorities of Korean Patent Application No.s 10-2009-0049200 filed on Jun. 3, 2009 and 10-2009-0119906 filed on Dec. 4, 2009, in the Korean Intellectual Property Office, the disclosures of which are incorporated herein by reference.

BACKGROUND OF THE INVENTION

1. Field of the Invention

The present invention relates to a power module and a display device that can be applied to an LED TV, and the like.

2. Description of the Related Art

Recently, a Flat Panel Display (FPD) which is a new technology which is appropriate for a multi-media system having a high resolution and a large-sized screen has become prominent in the display industry, as a replacement for a Cathode Ray Tube (CRT).

In particular, in the case of a large-sized display, a Liquid Crystal Display (LCD) TV has become prominent and has been expected to grow in prominence henceforth in view of price and marketability.

A Cold Cathode Fluorescent Lamp (CCFL) has been used as a backlight light source in the LCD TV according to the prior art. However, recently, the use of a Light Emitting Diode (LED) has been gradually increased due to various advantages including power consumption, life span and environmentally friendly characteristics.

Therefore, as the backlight unit that uses the LED becomes lower in price and more compact, the thickness of the flat screen TV has been gradually reduced to be slimmer, along with the internal power module of the flat screen TV.

A display device according to the prior art is configured to include a panel, a backlight unit that supports the panel, a circuit board that supplies power to the light source of the backlight unit, a transformer that is mounted on the circuit board and supplies the power to the circuit board, and a back cover that is coupled to the backlight unit and covers the circuit board and the transformer.

As the thickness of the display device, as constituted above, has been gradually reduced, a back cover made of a conductive material that can be more thinly formed, such as an iron plate, has been adopted, instead of a back cover made of a thick plastic material.

Further, in order to reduce the thickness of the display device, the transformer and the back cover that are mounted on the circuit board have been gradually moved closer to each other.

Under the circumstances, as the transformer and the back cover have been moved closer to each other, the following problems may arise.

First, in the case that the transformer is a resonant type in which a zero voltage switching (ZVS) operation is performed, when the conductive back cover is closer to the transformer, capacitance is formed between the transformer and the back cover and thus, switching loss is generated and a resonant frequency is shifted due to such capacitance, thereby causing a fatal problem in that the transformer malfunctions.

Also, when the transformer is closer to the back cover, magnetic flux is formed from the transformer to the back cover, thereby causing a problem in which power consumption is generated through the conductive back cover. That is, when the back cover is a conductive back cover such as an iron plate, the magnetic flux generated by the transformer is leaked to the back cover due to magnetic interference between the transformer and the conductive back cover of the circuit board during the operation of thereof, thereby causing problems wherein the overall power consumption is increased and the temperature of the transformer is raised due to power consumption generated from the back cover.

SUMMARY OF THE INVENTION

An aspect of the present invention provides a power module and a display device that can reduce power loss, malfunctions or switching loss of a transformer by blocking electromagnetic interference between a back cover made of a conductive material such as an iron plate and the transformer.

According to an aspect of the present invention, there is provided a power module for a display device including a panel, a backlight unit supporting the panel and including a light source, and a conductive back cover coupled to the backlight unit, the power module including: a circuit board supplying power to the light source included in the backlight unit; a transformer mounted on the circuit board and supplying power to the circuit board; and a shielding plate mounted on the circuit board and covering, in a non-contact manner, the upper surface of the transformer opposed to the lower surface of the transformer that faces the surface of the circuit board.

According to another aspect of the present invention, there is provided a power module for a display device including a panel, a backlight unit supporting the panel and including a light source, and a conductive back cover coupled to the backlight unit, the power module including: a circuit board supplying power to the light source included in the backlight unit; a resonant type transformer mounted on the circuit board and supplying the power to the circuit board; and a shielding plate mounted on the circuit board and covering, in a non-contact manner, the upper surface of the transformer positioned opposed to the lower surface of the transformer that faces the surface of the circuit board.

According to another aspect of the present invention, there is provided a display device including: a panel; a backlight unit supporting the panel and including a light source; a circuit board supplying power to the light source included in the backlight unit; a conductive back cover coupled to the backlight unit and covering the entire circuit board; a transformer mounted on the circuit board and supplying the power to the circuit board; and a shielding plate mounted on the circuit board and covering, in a non-contact manner, the upper surface of the transformer opposed to the lower surface of the transformer that faces the surface of the circuit board.

According to another aspect of the present invention, there is provided a display device including: a panel; a backlight unit supporting the panel and including a light source; a circuit board supplying power to the light source included in the backlight unit; a conductive back cover coupled to the backlight unit and covering the entire circuit board; a resonant type transformer mounted on the circuit board and supplying the power to the circuit board; and a shielding plate mounted on the circuit board and covering, in a non-contact manner, the upper surface of the transformer opposed to the lower surface of the transformer that faces the surface of the circuit board.

According to one aspect and other aspects of the present invention, the shielding plate may include a plurality of supporting parts coupled to and supported by the circuit board;

and a shielding region part supported by the plurality of supporting parts to be positioned between the upper surface of the transformer and the back cover and including a shielding material.

The plurality of supporting parts may include the shielding material in the portions thereof.

As one exemplification of the shielding plate, the shielding region part and the plurality of supporting parts of the shielding plate may include a first insulation plate, and the shielding region part of the shielding plate may include a shielding member attached to the surface of the first insulation plate that faces the back cover and made of a shielding material that blocks electro-magnetic interference between the transformer and the back cover.

As another exemplification of the shielding plate, the shielding region part and the plurality of supporting parts of the shielding plate may include a first insulation plate that is positioned on the inner side and a second insulation plate that is positioned on the outer side, bonded to each other, and the shielding region part of the shielding plate may include a shielding member inserted between the first insulation plate and the second insulation plate and made of the shielding material that blocks electro-magnetic interference between the transformer and the back cover.

At least one of the plurality of supporting parts may be coupled to the circuit board by bonding.

Alternately, at least one of the supporting parts of the shielding plate may include an inserting part, of which lower end is projected and a supporting sill which is positioned beside the inserting part and of which lower end is not projected, wherein the inserting part is inserted into a fastener formed on the circuit board.

Further, at least one of the plurality of supporting parts may include a fastening sill having a lower end of which portion is bent in the direction of the shielding region part and inserted and coupled to the fastener formed on the circuit board.

At this time, the fastening sill may be formed on at least any one of the first insulation plate and the second insulation plate of the plurality of supporting parts.

The plurality of supporting parts may further include a supporting sill supported on the surface of the circuit board, instead of the fastening sill.

According to another aspect of the present invention, there is provided a display device including: a panel; a backlight unit supporting the panel and including a light source; a circuit board supplying power to the light source included in the backlight unit; a conductive back cover coupled to the backlight unit and covering the entire circuit board; a resonant type transformer mounted on the circuit board and supplying power to the circuit board; and a shielding plate bonded to the inner side surface of the back cover that faces the transformer.

According to another aspect of the present invention, the shielding plate may include a shielding member bonded to the inner side surface of the back cover, that faces the transformer; and an insulation plate covering the entire shielding member and attached to the inner side surface of the back cover that covers the shielding member and the surroundings of the shielding member.

According to one aspect and other aspects of the present invention, the shielding member may be made of a material having a lower resistance value than that of the back cover.

The shielding member may be made of aluminum or copper.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
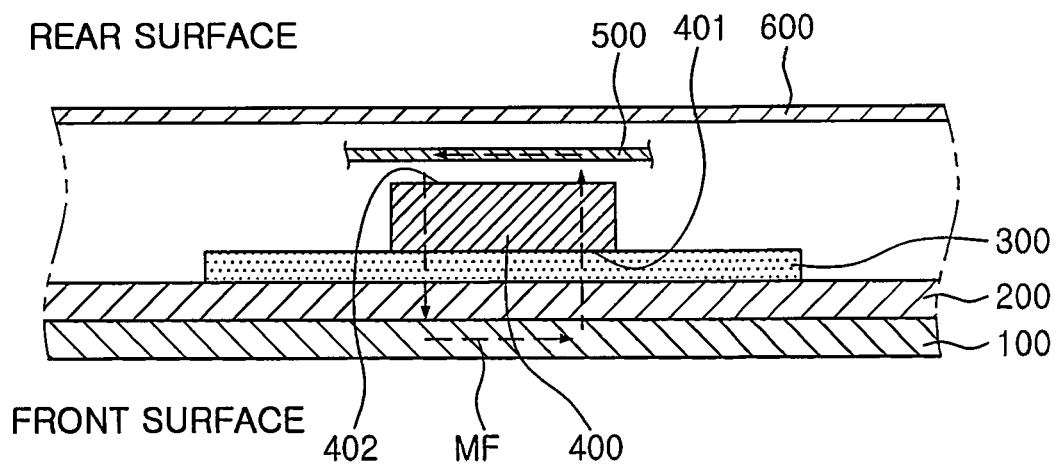
FIG. 1 is a cross-sectional structural diagram of a display device according to an exemplary embodiment of the present invention.

Exemplary embodiments of the present invention will now be described in detail with reference to the accompanying, drawings.

The present invention is not limited to the exemplary embodiments, but the exemplary embodiments are used to help understanding of the technical spirit of the present invention. Throughout the drawings referenced in the present invention, like components having substantially the same configurations and functions will be denoted by like reference numerals and repetitive explanation of the same reference numerals will be omitted.

Figure 2:
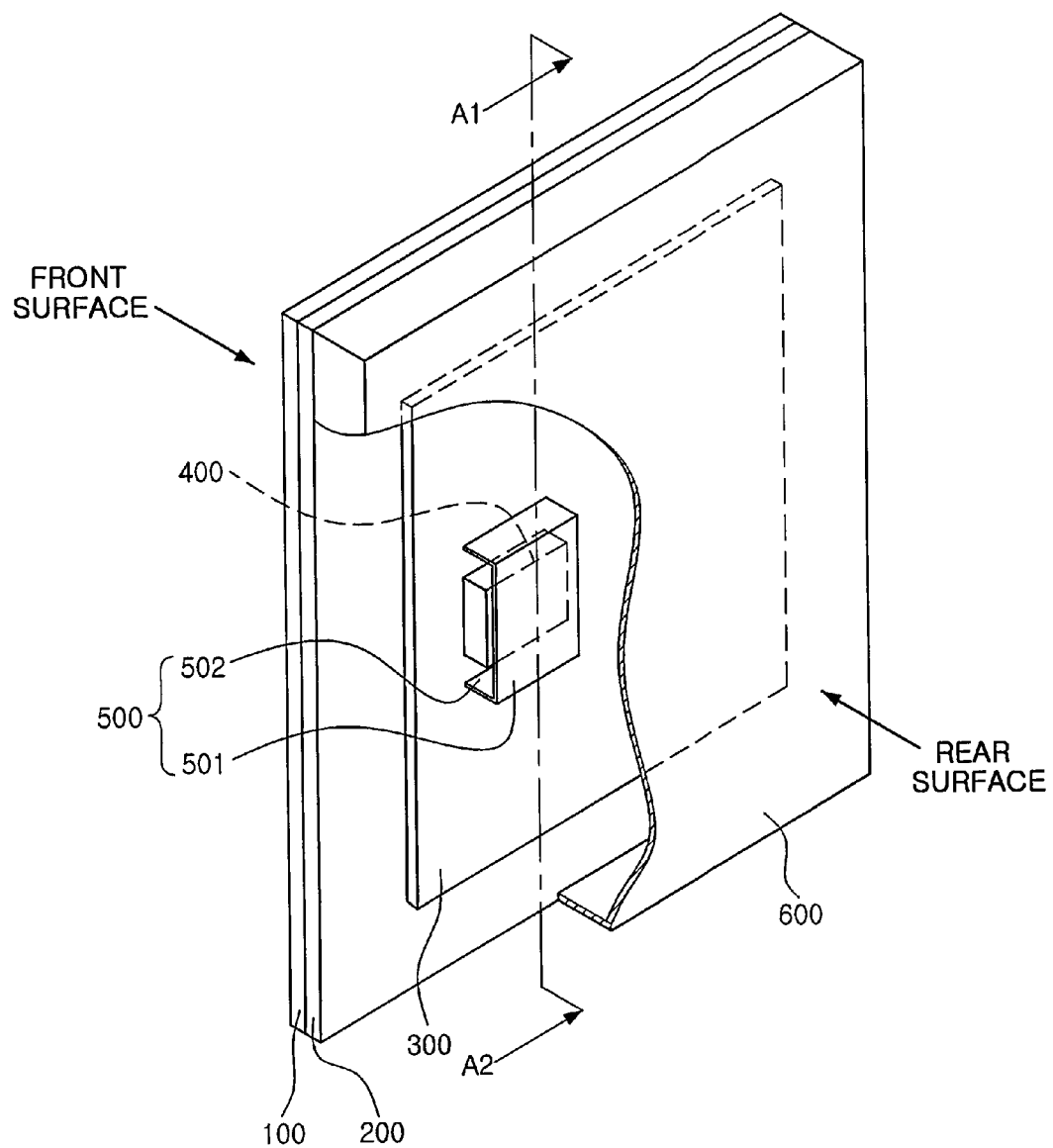
FIG. 2 is a partial cutaway perspective view of a display device according to an exemplary embodiment of the present invention.
Figure 3:
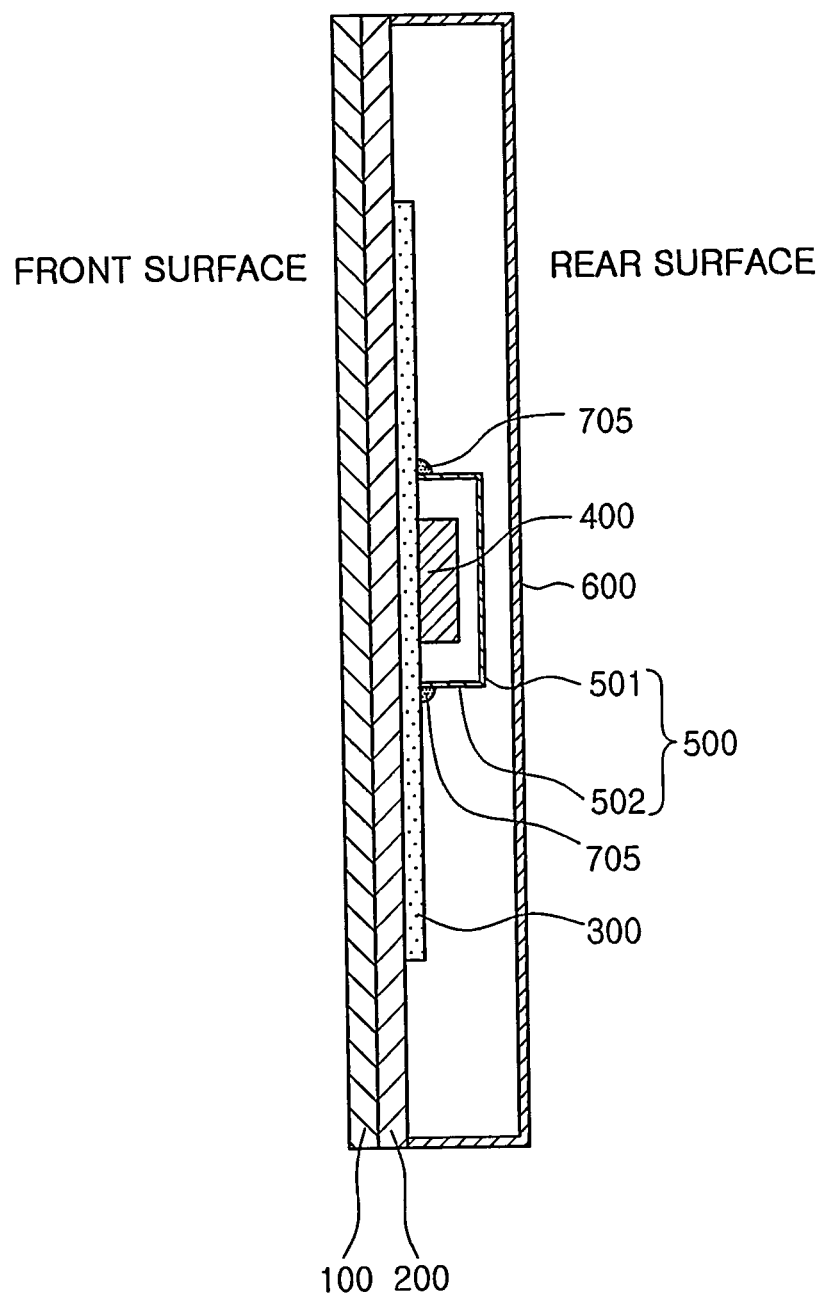
FIG. 3 is a cross-sectional diagram taken along line A1-A2 shown in FIG. 2.

FIG. 1 is a cross-sectional structural diagram of a display device according to an exemplary embodiment of the present invention, FIG. 2 is a partial cutaway perspective view of a display device according to an exemplary embodiment of the present invention and FIG. 3 is a cross-sectional diagram taken along line A1-A2 shown in FIG. 2.

Referring to FIGS. 1 through 3, the display device according to the present invention may be configured to include: a panel 100, a backlight unit 200 that supports the panel 100 and includes a light source, a circuit board 300 that supplies power to the light source included in the backlight unit 200, a conductive back cover 600 that is coupled to the backlight unit 200 and covers the entire circuit board 300.

Further, the display device according to the present invention may include a transformer 400 that is mounted on the circuit board 300 and supplies power to the circuit board 300, and a shielding plate 500 that is mounted on the circuit board 300 and covers, in a non-contact manner, the upper surface 402 that is opposed to the lower surface 401 of the transformer 400 that faces the surface of the circuit board 300.

As shown, the shielding plate 500 may also cover both side surfaces of the transformer 400 which are positioned on both sides of the upper surface 402, as well as the upper surface 402 of the transformer 400, in a non-contact manner.

The panel 100 of the present invention may be an LCD panel, however, it is not limited thereto.

For example, in the case that the panel 100 is an LCD panel, the backlight unit 200 may include a light guide panel, a plurality of sheets, a lamp reflector, and a mold frame (or a support main), as well as the lamp that is the light source.

The plurality of sheets may include a reflection sheet, a diffusion sheet, a prism sheet, and a protect sheet.

Further, a power module according to the present invention is configured to include the circuit board 300, the transformer 400, and the shielding plate 500. When the power module is mounted on the display device, the lower surface of the transformer 400 is the surface that faces the circuit board 300, and the upper surface 402 of the transformer 400 is the surface that faces the back cover 600.

In order to meet Electrical Safety Standards, the shielding plate 500 is formed in a non-contact manner that is not electrically connected with the transformer 400 so that a predetermined safe distance from the transformer 400 may be secured.

In particular, a portion of the shielding plate 500 of the present invention is coupled to and supported by the circuit board 300 and a portion of the shielding plate 500 that is positioned between the upper surface 402 of the transformer 400 and the back cover 600 includes a shielding material, such that electro-magnetic interference between the back cover 600 and the transformer 400 can be blocked. In addition, neither the shape of the shielding plate 500 nor the manner of coupling the shielding plate 500 and the circuit board 300 is limited to the embodiments depicted herein.

Further, referring to FIG. 3, first, as for the manner in which the shielding plate 500 is coupled to the circuit board 300, the shielding plate 500 may be coupled to the circuit board 300 by an adhesive bonding 705, as shown in FIG. 3.

In other words, the shielding plate 500 may be directly coupled to the circuit board 300 by the adhesive bonding 705.

Referring to FIGS. 4 through 12, the coupling manner between the shielding plate 500 and the circuit board 300 as well as the structure of the shielding plate will be described.

Figure 4:
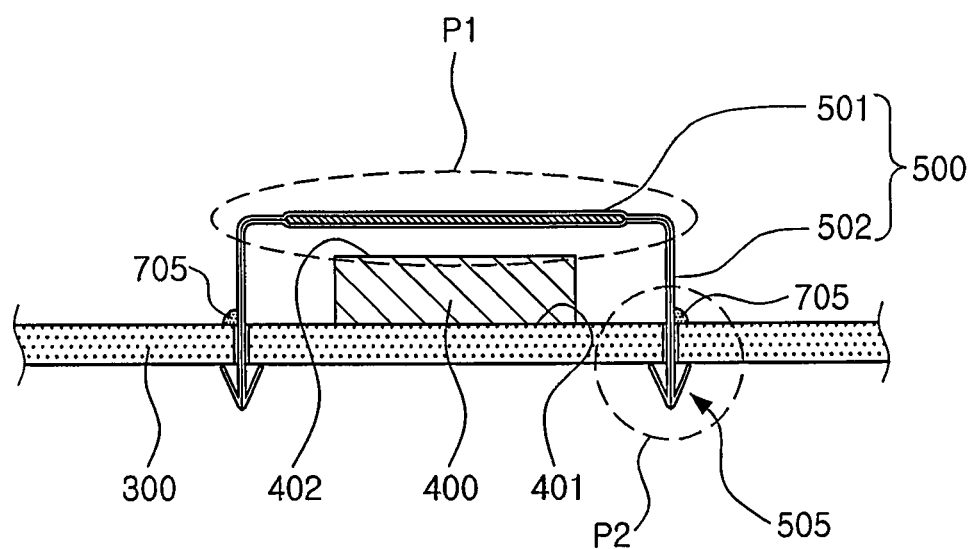
FIG. 4 is a cross-sectional structural diagram of a power module according to an exemplary embodiment of the present invention.

FIG. 4 is a cross-sectional structural diagram of a power module according to an exemplary embodiment of the present invention.

Referring to FIG. 4, the shielding plate 500 may include a plurality of supporting parts 502 that are coupled to and supported by the circuit board 300, and a shielding region part 501 that is supported by the plurality of supporting parts 502 and does not contact the transformer 400, such that it is positioned between the transformer 400 and the back cover 600.

Herein, a shielding material may be included in portions of the shielding region part 501 and the plurality of supporting parts 502.

The manner in which the plurality of supporting parts 502 are coupled to the circuit board 300 is not specifically limited, however, at least one of a contact manner and a structural coupling manner may be adopted.

For example, the shielding plate 500 of the present invention may be coupled to the circuit board 300 by the adhesive bonding 705.

As another example, a portion of the supporting parts of the shielding plate 500 according to the present invention may be inserted into a fastener that is formed on the circuit board 300 and may also be more firmly coupled thereto by the adhesive bonding 705.

Figure 5:
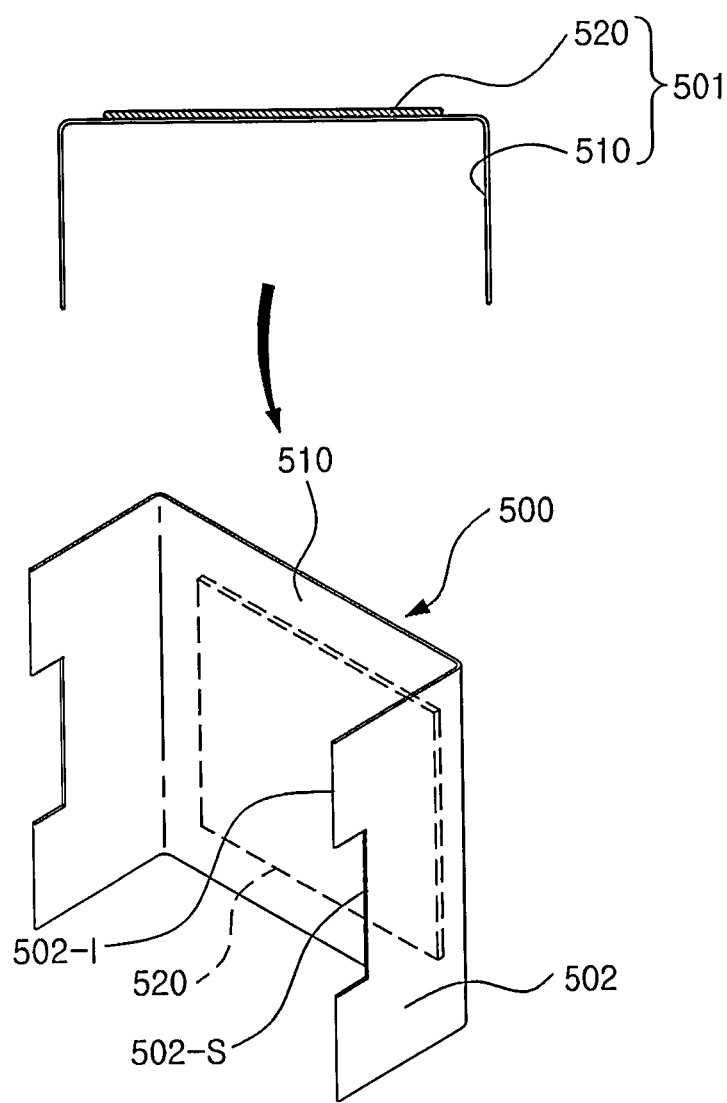
FIG. 5 is a structural diagram showing a first exemplification of a shielding plate according to an exemplary embodiment of the present invention.

FIG. 5 is a structural diagram showing a first exemplification of a shielding plate according to an exemplary embodiment of the present invention.

Referring to FIGS. 4 and 5, the shielding region part 501 and the plurality of supporting parts 502 of the shielding plate 500 may include a first insulation plate 510.

Further, the shielding region part 501 of the shielding plate 500 may include a shielding member 520 that is attached to the surface of the first insulation plate 510 which faces the back cover 600 and is made of a shielding material that blocks electro-magnetic interference between the transformer 400 and the back cover 600.

At this time, the first insulation plate 510 can secure the electrical safety distance between the transformer 400 and the shielding member 520.

As described above, among the various couplings between the shielding plate 500 and the circuit board 300, as shown in FIG. 5, at least one of the supporting parts 502 of the shielding plate 500 according to the present invention may include a inserting part 502-I of which lower end is projected and a supporting sill 502-S which is positioned beside the inserting part 502-I and of which lower end is not projected. Herein, the inserting part 502-I may be inserted into a fastener 310 that is formed on the circuit board 300.

At this time, the inserting part 502-I and the supporting sill 502-S may be formed alternately, wherein the inserting part 502-I of the supporting part 502 is inserted into the fastener 310 of the circuit board 300 and the supporting sill 502-S of the supporting part 502 functions as a stopper so as to stop the supporting part 502 from being excessively inserted into the fastener 310 of the circuit board 300, thereby making it possible to maintain a predetermined distance between the shielding plate 500 and the circuit board 300.

Therefore, the inserting part 502-I of the shielding plate 500 according to the present invention can be inserted into the fastener 310 that is formed on the circuit board 300 and at this time, it can be more firmly coupled thereto by the adhesive bonding 705.

Figure 6:
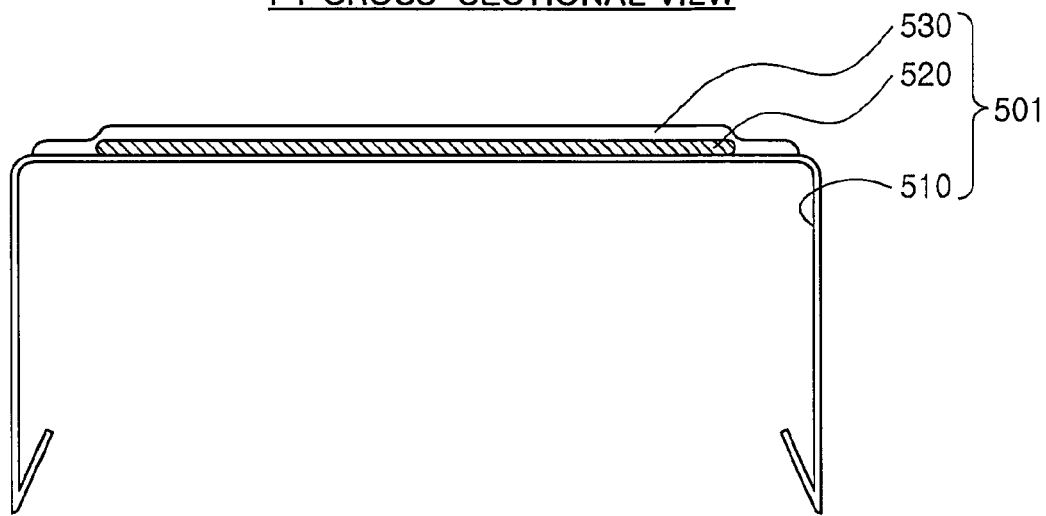
FIG. 6 is a structural diagram showing a second exemplification of a shielding plate according to an exemplary embodiment of the present invention.
Figure 7:
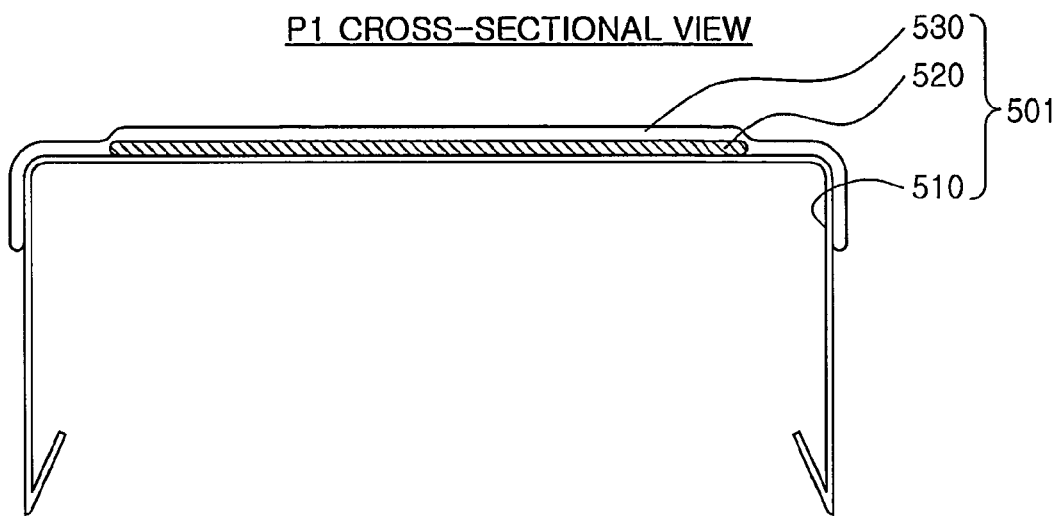
FIG. 7 is a structural diagram showing a third exemplification of a shielding plate according to an exemplary embodiment of the present invention.

FIG. 6 is a structural diagram showing a second exemplification of a shielding plate according to an exemplary embodiment of the present invention, and FIG. 7 is a structural diagram showing a third exemplification of a shielding plate according to an exemplary embodiment of the present invention.

Referring to FIGS. 4 through 7, the shielding plate 500 having a structure as shown in FIG. 5 may further include a second insulation plate 530 which will now be described in detail.

Figure 8:
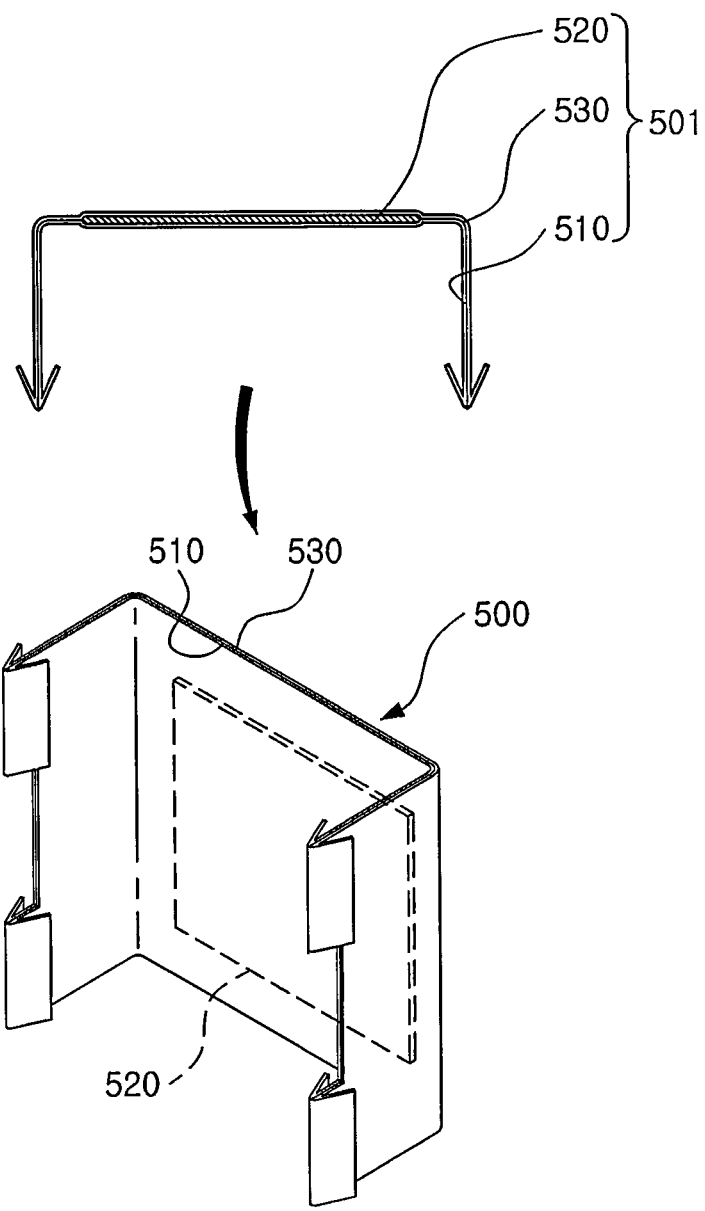
FIG. 8 is a structural diagram showing a fourth exemplification of a shielding plate according to an exemplary embodiment of the present invention.
Figure 9:
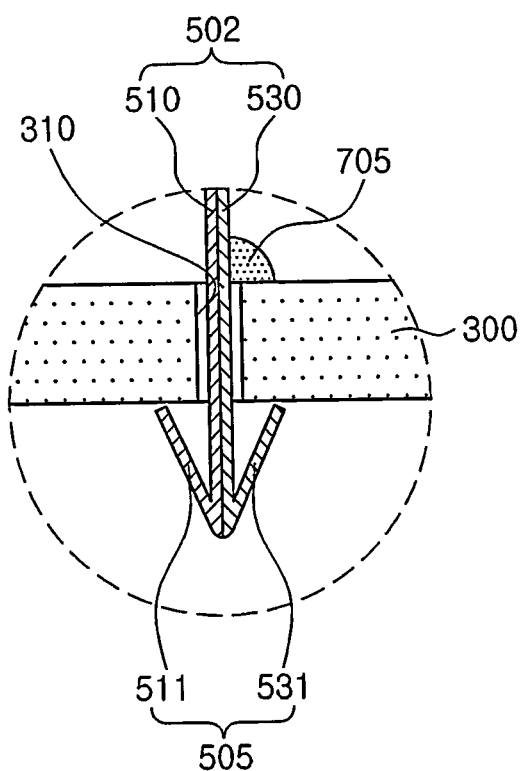
FIG. 9 is a diagram showing a coupling structure of a plurality of supporting parts of a shielding plate to a circuit board according to an exemplary embodiment of the present invention.

Referring to FIGS. 4, 8 and 9, the shielding region part 501 of the shielding plate 500 may include the first insulation plate 510 that is positioned on the inner side and the second insulation plate 530 that is positioned on the outer side, being bonded to each other. The plurality of supporting parts 502 of the shielding plate 500 may include the first insulation plate 510.

The shielding region part 501 of the shielding plate 500 may include a shielding member 520 that is inserted between the first insulation plate 510 and the second insulation plate 530 and is made of a shielding material that blocks electro-magnetic interference between the transformer 400 and the back cover 600.

At this time, the second insulation plate 530 covers the shielding member 520 in the shielding region part 501, thereby allowing the shielding member 520 to not be exposed to the outside.

As shown in FIG. 7, the second insulation plate 530 may not be coupled to the circuit board 300 but be extended only to a partial region of the plurality of supporting parts 502.

In this case, a fastening sill 505 may be formed only on the first insulation plate 510 that is coupled to the circuit board 300.

FIG. 8 is a structural diagram showing a fourth exemplification of a shielding plate according to an exemplary embodiment of the present invention, and FIG. 9 is a diagram showing a coupling structure of a plurality of supporting parts of a shielding plate to a circuit board according to an exemplary embodiment of the present invention.

Referring to FIGS. 4, 8 and 9, the shielding region part 501 and the plurality of supporting parts 502 of the shielding plate 500 may include the first insulation plate 510 that is positioned on the inner side, and the second insulation plate 530 that is positioned on the outer side, being bonded to each other.

Further, the shielding region part 501 of the shielding plate 500 may include the shielding member 520 that is inserted between the first insulation plate 510 and the second insulation plate 530 and is made of the shielding material that blocks electro-magnetic interference between the transformer 400 and the back cover 600.

As described above, the shielding member 520 of the shielding plate 500 according to the present invention is formed in a sandwich structure that it is formed between the first and the second insulation plates 510 and 530 not to be exposed to the outside of the first and second insulation plates 510 and 530, thereby making it possible to obtain particular effects.

In other words, when the entire shielding plate 500 is separated from the circuit board 300, the shielding member 520 is not directly connected to the circuits or the components of the circuit board 300, thereby making it possible to protect the internal circuits and components of the display device when the entire shielding plate 500 is separated from the circuit board 300.

Further, the second insulation plate 530 is firmly attached to the first insulation plate 510 and at the same time, is coupled to the circuit board 300 together with the first insulation plate 510, thereby making it possible to prevent the shielding member 520 from being separated from the first insulation plate 510.

In addition to the coupling methods of bonding and insertion as described above, the fastening sill 505 may be formed at a partial end of the plurality of supporting parts 502 of the shielding plate 500 by way of another example, wherein the fastening sill 505 may be penetrated through and inserted into the fastener 310 formed on the circuit board 300.

At this time, the shielding plate 500 can be more firmly coupled to the circuit board 300 by both the adhesive bonding 705 and the fastening sill 505.

Herein, in order to enhance adhesive force between the shielding plate 500 and the circuit board 300, all the coupling manners such as the bonding, the inserting and the fastening as described above may be used or at least one of the above-mentioned coupling manners may also be used.

Herein, the fastening sill has a sill for coupling the circuit board to the shielding plate, and the shape or the forming direction thereof is not specifically limited.

With the fastening sills 505 of the plurality of supporting parts 502, portions of the lower ends of the supporting parts 502 configured of the first insulation plate 510 and the second insulation plate 530 may be bent in the direction of the shielding region part 501.

Further, the fastening sill 505 may be formed at any one of the first insulation plate 510 and the second insulation plate 530 of the plurality of supporting parts 502, as shown in FIGS. 6 and 7. At this time, the direction to be bent may be any one of the inner direction and the outer direction.

Alternately, the fastening sills 505 may be formed at the first insulation plate 510 and the second insulation plate 530 of the plurality of supporting parts 502, respectively. In this case, the fastening sills 505 formed within the plurality of supporting parts 502 may be provided with the respective lower ends of the first insulation plate 510 and the second insulation plate 530, which are bent in directions opposite to each other.

As described above, when the fastening sill 505 is formed at the respective first insulation plate 510 and second insulation plate 530 to penetrate through the fastener 310 of the circuit board 300, the fastening force between the shielding plate 500 and the circuit board 300 can be enhanced.

As described above, even after the shielding plate 500 is fastened to the circuit board 300 by the fastening sill 505, the shielding plate 500 can also be more firmly coupled to the circuit board 300 by the adhesive bonding 705.

At this time, the first and second insulation plates 510 and 530 may be made of an insulating material having elasticity. In this case, the fastening sill 505 becomes a bending sill made of a thin insulation plate having elasticity which is deformed by external force and is restored into its original state when the external force is removed.

Therefore, the shielding plate 500 is able to be easily fastened to the circuit board 300 by the fastening sill 505, and after the shielding plate 500 is fastened to the circuit board 300, the shielding plate 500 is not easily separated from the circuit board 300.

Meanwhile, the shielding member 520 may be formed to have a larger area than the area of the upper surface 402 of the transformer 400, so as to enhance the shielding effects thereof.

Further, the shielding member 520 may be made of a material having a lower resistance value than that of the back cover so as to effectively block the magnetic flux generated by the transfer 400 from being leaked to the back cover 600. For example, the shielding member 520 may be made of aluminum or copper.

Meanwhile, a Light Emitting Diode (LED) may be used as a light source of the backlight unit 200 according to the present invention, and power elements, power components, power related circuits, and the like required for supplying power to the display device according to the present invention as well as the transformer 400 may be formed on the circuit board 300.

According to the shielding plate 500 of the present invention as described above, the electro-magnetic interference between the transformer 400 and the back cover 600 can be blocked. In this case, the magnetic flux MF generated from the transformer 400 is blocked by the shielding plate 500, such that it is not leaked to the back cover 600. Therefore, the magnetic flux is not leaked to the back cover 600 but is blocked, such that the heat generated from the transformer 400 and the back cover 600 can be reduced and the power consumption generated therefrom can also be reduced.

In particular, as the transformer 400, a resonant type transformer that performs Zero-Voltage Switching (ZVS) may be adopted. Such a resonant type transformer includes an LC resonant circuit therein so as to perform the ZVC. When the LC resonant circuit is affected by peripheral capacitances or inductances, the resonant frequency of the LC resonant circuit may be shifted.

Therefore, in the display device mounted with the resonant type transformer, the back cover 600 that covers the circuit board 300 may be made of a conductive material such as an iron plate so as to reduce the thickness of the display device. In particular, in this case, the electro-magnetic interference that may be generated between the transformer 400 and the back cover 600 must be more definitely blocked. To this end, it is necessary that the shielding plate 500 is installed in a non-contact manner with regard to the transformer 400, in a manner that it is positioned between the transformer 400 and the back cover 600.

When the transformer 400 is a resonant type as described above, more serious problems than heating and power consumption may be generated, such that the shielding plate 500 of the present invention is indispensable.

Figure 10:
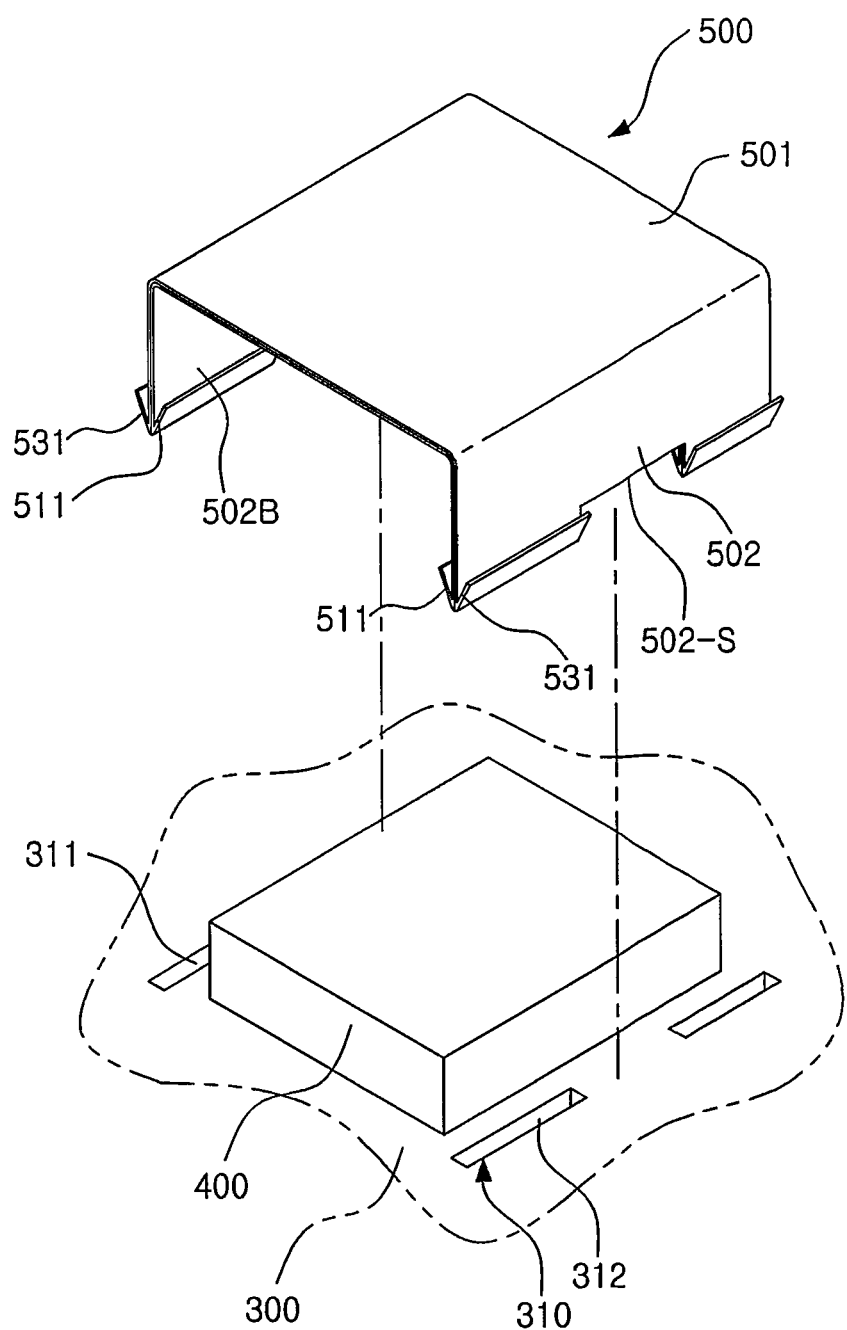
FIG. 10 is an exploded perspective view showing a fourth exemplification of a shielding plate according to an exemplary embodiment of the present invention.
Figure 11:
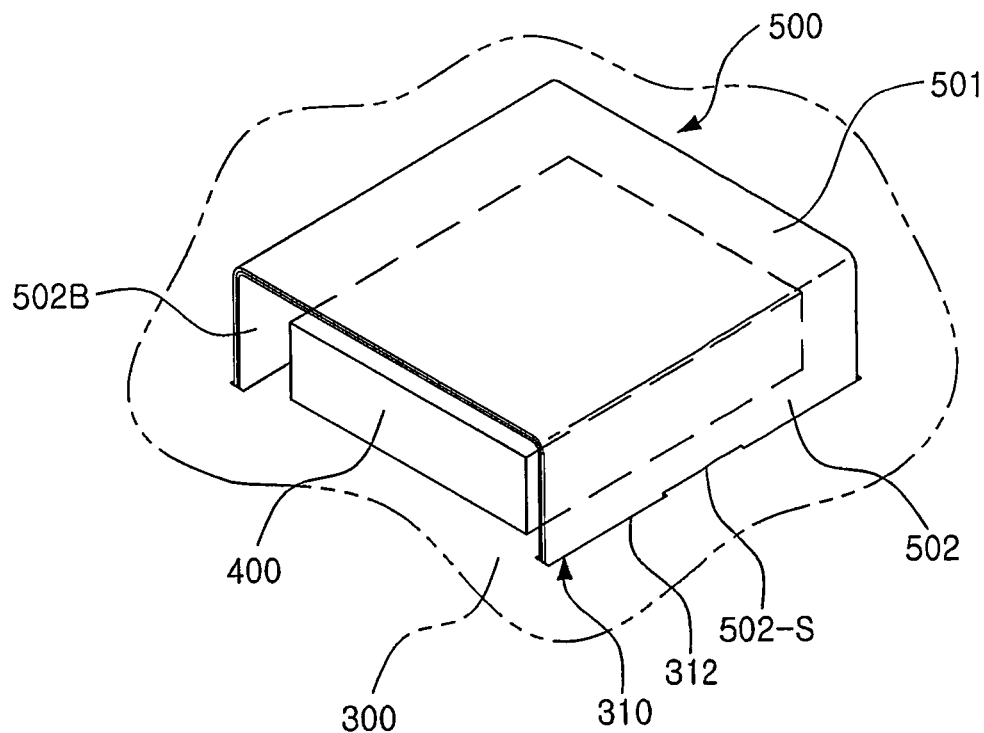
FIG. 11 is a coupled perspective view showing a fourth exemplification of a shielding plate according to an exemplary embodiment of the present invention.

FIG. 10 is an exploded perspective view showing a fourth exemplification of a shielding plate according to an exemplary embodiment of the present invention, and FIG. 11 is a coupled perspective view showing a fourth exemplification of a shielding plate according to an exemplary embodiment of the present invention.

As shown in FIGS. 10 and 11, the plurality of supporting parts 502 includes the fastening sill 505 that is inserted and coupled to the fastener 310 of the circuit board 300 and the supporting sill 502-S that is not provided with the fastening sill and is supported on the surface of the circuit board 300, wherein the fastening sill 505 and the supporting sill 502-S may be formed alternately to each other.

Herein, the fastening sill 505 is inserted and coupled to the fastener 310 of the circuit board 300 as described above, and the supporting sill 502-S functions as a stopper so as to stop the supporting part 502 from being excessively inserted into the fastener 310 of the circuit board 300, thereby making it possible to maintain a predetermined distance between the shielding plate 500 and the circuit board 300.

In FIGS. 4 through 11, the plurality of supporting parts 502 are illustrated in units of two, however, neither the number of the plurality of supporting parts 502 nor the number of the fastening sill 505 is limited to the embodiments depicted herein.

Figure 12:
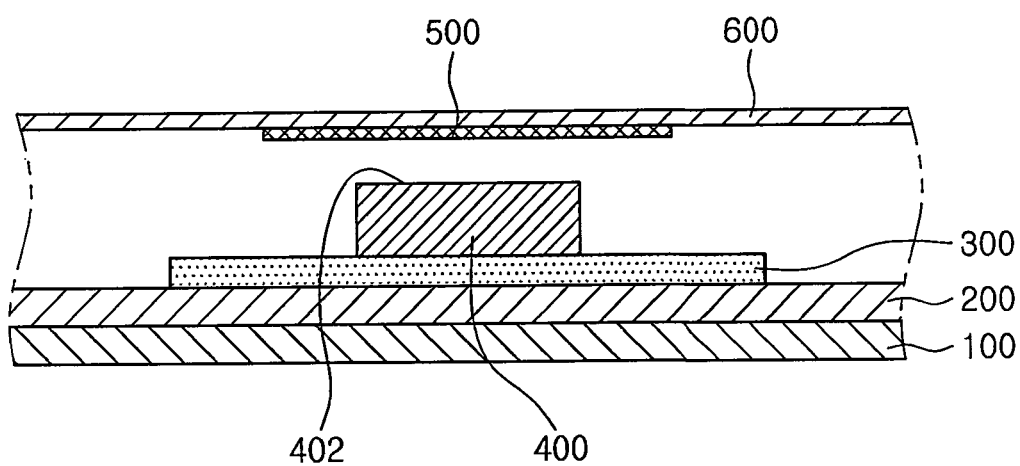
FIG. 12 is a structural diagram showing a fifth exemplification of a shielding plate according to an exemplary embodiment of the present invention.
Figure 13:
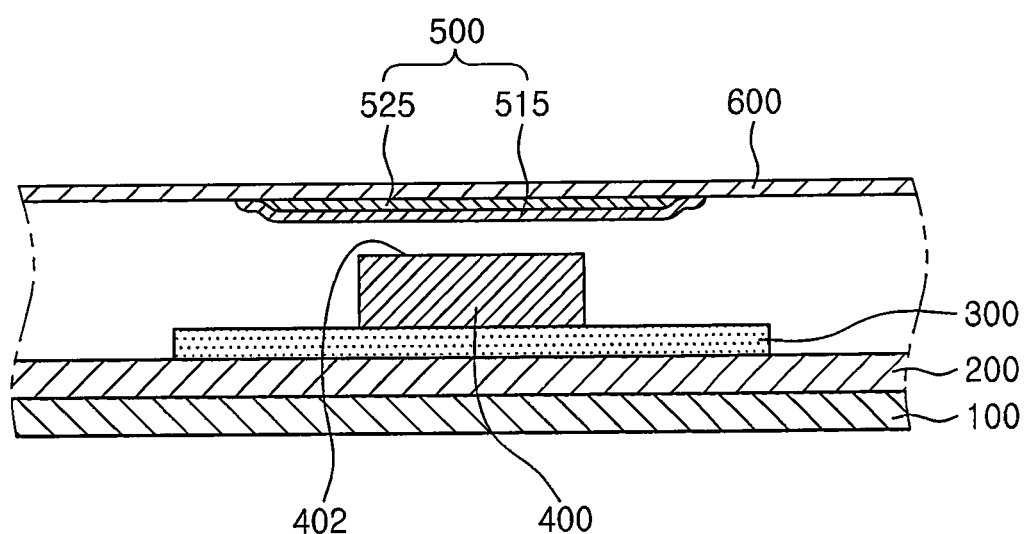
FIG. 13 is a modification diagram of a fifth exemplification of a shielding plate according to an exemplary embodiment of the present invention.

FIG. 12 is a structural diagram showing a fifth exemplification of a shielding plate according to an exemplary embodiment of the present invention, and FIG. 13 is a modification diagram of a fifth exemplification of a shielding plate according to an exemplary embodiment of the present invention.

Referring to FIG. 12, the shielding plate 500 according to the present invention may be bonded to the inner side surface of the back cover 600 that faces the transformer 400.

Referring to FIG. 13, the shielding plate 500 may include a shielding member 525 that is bonded to the inner side surface of the back cover 600 that faces the transformer 400 and an insulation plate 515 that covers the entire shielding member 525 and is attached to the inner side surface of the back cover 600 covering the shielding member 525 and the surroundings of the shielding member 525.

The shielding member 525 of the shielding plate 500 may be formed to have a larger area than the area of the upper surface 402 of the transformer 400, so as to enhance shielding effects thereof.

Further, the shielding member 525 may be made of a material having a lower resistance value than that of the back cover so as to effectively block the magnetic flux generated from the transfer 400 from being leaked to the back cover 600. For example, the shielding member 525 may be made of aluminum or copper.

In this case, although the shielding member 525 is attached to the back cover 600 by sufficient adhesive force, the shielding member 525 may be separated from the back cover 600 due to the lowering of the adhesive force between the back cover 600 and the shielding member 525 during the use thereof. Therefore, the shielding member 525 can be more firmly attached to the back cover 600 by the insulation plate 515.

As described above, the present invention can solve the technical problems of the prior art.

In other words, when the transformer is a resonant type in which a zero voltage switching (ZVS) operation is performed, a capacitance is formed between the transformer and the back cover if the conductive back cover is closer to the transformer and thus, switching loss is generated and a resonant frequency is shifted due to such capacitance, thereby causing a problem in which the transformer generates malfunctions. However, such a problem can be solved by the present invention.

Further, as the transformer is closer to the back cover, magnetic flux is formed from the transformer to the back cover, thereby causing a problem that power consumption is generated through the conductive back cover. However, such a problem can be solved by the present invention.

In short, when the back cover is the conductive back cover such as an iron plate, the magnetic flux generated by the transformer is leaked to the back cover due to magnetic interference between the transformer and the conductive back cover of the circuit board during the operation thereof, thereby causing problems in that overall power consumption is increased due to power consumption generated from the back cover and that the temperature of the transformer is raised. However, such problems can be solved by the present invention.

As set forth above, according to exemplary embodiments of the invention, the electro-magnetic interference between the back cover made of a conductive material such as an iron plate and the transformer is blocked, thereby making it possible to reduce transformer power loss, reduce heat generated from the transformer and the back cover, and prevent malfunctions of the transformer that may be caused by the switching loss.

While the present invention has been shown and described in connection with the exemplary embodiments, it will be apparent to those skilled in the art that modifications and variations can be made without departing from the spirit and scope of the invention as defined by the appended claims.

What is claimed is:

1. A power module for a display device including a panel, a backlight unit supporting the panel and including a light source, and a conductive back cover coupled to the backlight unit, the power module comprising:
 a circuit board configured to supply power to the light source included in the backlight unit;
 a transformer mounted on the circuit board and configured to supply power to the circuit board, the transformer having opposite upper and lower surfaces, the lower surface facing the circuit board; and a shielding plate mounted on the circuit board and covering, in a non-contact manner, the upper surface of the transformer, wherein the shielding plate includes:

a plurality of supporting parts coupled to and supported by the circuit board; and a shielding region part supported by the plurality of supporting parts to be positioned between the upper surface of the transformer and the back cover, and including a shielding material, the shielding region part and the plurality of supporting parts of the shielding plate include a first insulation plate that is positioned on an inner side, and a second insulation plate that is positioned on an outer side, the first and second insulation plates bonded to each other, the shielding region part of the shielding plate includes a shielding member inserted between the first insulation plate and the second insulation plate, and made of the shielding material for blocking electromagnetic interference between the transformer and the back cover, and at least one of the supporting parts of the shielding plate includes:

an inserting part of which a lower end is projected; and a supporting sill which is positioned beside the inserting part and of which a lower end is not projected, wherein the inserting part is inserted into a fastener formed on the circuit board.

2. The power module of claim 1, wherein at least one of the plurality of supporting parts is coupled to the circuit board by a bonding.

3. The power module of claim 1, wherein the shielding material has a lower resistance value than that of the back cover.

4. The power module of claim 1, wherein the transformer includes a resonant type transformer.

5. The power module of claim 3, wherein the shielding material includes aluminum or copper.

6. The power module of claim 4, wherein at least one of the plurality of supporting parts is coupled to the circuit board by a bonding.

7. The power module of claim 4, wherein the shielding material has a lower resistance value than that of the back cover.

8. The power module of claim 7, wherein the shielding material includes aluminum or copper.

9. A power module for a display device including a panel, a backlight unit supporting the panel and including a light source, and a conductive back cover coupled to the backlight unit, the power module comprising:

a circuit board configured to supply power to the light source included in the backlight unit;

a transformer mounted on the circuit board and configured to supply power to the circuit board, the transformer having opposite upper and lower surfaces, the lower surface facing the circuit board; and a shielding plate mounted on the circuit board and covering, in a non-contact manner, the upper surface of the transformer, wherein the shielding plate includes:

a plurality of supporting parts coupled to and supported by the circuit board; and a shielding region part supported by the plurality of supporting parts to be positioned between the upper surface of the transformer and the back cover, and including a shielding material, the shielding region part and the plurality of supporting parts of the shielding plate include a first insulation plate that is positioned on an inner side, and a second insulation plate that is positioned on an outer side, the first and second insulation plates bonded to each other, the shielding region part of the shielding plate includes a shielding member inserted between the first insulation plate and the second insulation plate, and made of the shielding material for blocking electromagnetic interference between the transformer and the back cover, and at least one of the plurality of supporting parts includes a fastening sill having a lower end of which a portion is bent in the direction of the shielding region part and inserted and coupled to a fastener formed on the circuit board.

10. The power module of claim 9, wherein the fastening sill is formed on any one of the first insulation plate and the second insulation plate of the plurality of supporting parts.

11. The power module of claim 9, wherein the fastening sill is formed on the first insulation plate and the second insulation plate of the plurality of supporting parts, respectively.

12. The power module of claim 9, wherein the plurality of supporting parts further includes a supporting sill supported on the surface of the circuit board.

13. The power module of claim 9, wherein the transformer includes a resonant type transformer.

14. The power module of claim 13, wherein the fastening sill is formed on any one of the first insulation plate and the second insulation plate of the plurality of supporting parts.

15. The power module of claim 13, wherein the fastening sill is formed on the first insulation plate and the second insulation plate of the plurality of supporting parts, respectively.

16. The power module of claim 13, wherein the plurality of supporting parts further includes a supporting sill supported on the surface of the circuit board.

17. A display device, comprising:

a panel;

a backlight unit supporting the panel and including a light source;

a circuit board configured to supply power to the light source included in the backlight unit;

a conductive back cover coupled to the backlight unit and covering the entire circuit board;

a transformer mounted on the circuit board and configured to supply the power to the circuit board, the transformer having opposite upper and lower surfaces, the lower surface facing the circuit board; and a shielding plate mounted on the circuit board and covering, in a non-contact manner, the upper surface of the transformer, wherein the shielding plate includes:

a plurality of supporting parts coupled to and supported by the circuit board; and a shielding region part supported by the plurality of supporting parts to be positioned between the upper surface of the transformer and the back cover, and including a shielding material, the shielding region part and the plurality of supporting parts of the shielding plate include a first insulation plate that is positioned on an inner side, and a second insulation plate that is positioned on an outer side, the first and second insulation plates bonded to each other, the shielding region part of the shielding plate includes a shielding member inserted between the first insulation plate and the second insulation plate, and made of the shielding material for blocking electromagnetic interference between the transformer and the back cover, and at least one of the plurality of supporting parts includes a fastening sill having a lower end of which a portion is bent in the direction of the shielding region part and inserted and coupled to a fastener formed on the circuit board.

18. The display device of claim 17, wherein at least one of the plurality of supporting parts is coupled to the circuit board by a bonding.

19. The display device of claim 17, wherein the fastening sill is formed on at least one of the first insulation plate and the second insulation plate of the plurality of supporting parts.

20. The display device of claim 17, wherein the fastening sill is formed on the first insulation plate and the second insulation plate of the plurality of supporting parts, respectively.

21. The display device of claim 17, wherein the plurality of supporting parts further includes a supporting sill supported on the surface of the circuit board.

22. The display device of claim 17, wherein the shielding material has a lower resistance value than that of the back cover.

23. The display device of claim 17, wherein the transformer includes a resonant type transformer.

24. The display device of claim 22, wherein the shielding material includes aluminum or copper.

25. The display device of claim 23, wherein at least one of the plurality of supporting parts is coupled to the circuit board by a bonding.

26. The display device of claim 23, wherein the fastening sill is formed on at least one of the first insulation plate and the second insulation plate of the plurality of supporting parts.

27. The display device of claim 23, wherein the fastening sill is formed on the first insulation plate and the second insulation plate of the plurality of supporting parts, respectively.

28. The display device of claim 23, wherein the plurality of supporting parts further includes a supporting sill supported on the surface of the circuit board.

29. The display device of claim 23, wherein the shielding material has a lower resistance value than that of the back cover.

30. The display device of claim 29, wherein the shielding material includes aluminum or copper.

31. A display device, comprising:
a panel;
a backlight unit supporting the panel and including a light source;
a circuit board configured to supply power to the light source included in the backlight unit;
a conductive back cover coupled to the backlight unit and covering the entire circuit board;
a transformer mounted on the circuit board and configured to supply the power to the circuit board, the transformer having opposite upper and lower surfaces, the lower surface facing the circuit board; and
a shielding plate mounted on the circuit board and covering, in a non-contact manner, the upper surface of the transformer,
wherein
the shielding plate includes:
a plurality of supporting parts coupled to and supported by the circuit board; and
a shielding region part supported by the plurality of supporting parts to be positioned between the upper surface of the transformer and the back cover, and including a shielding material,
the shielding region part and the plurality of supporting parts of the shielding plate include
a first insulation plate that is positioned on an inner side, and
a second insulation plate that is positioned on an outer side, the first and second insulation plates bonded to each other,
the shielding region part of the shielding plate includes a shielding member inserted between the first insulation plate and the second insulation plate, and made of the shielding material for blocking electromagnetic interference between the transformer and the back cover,
at least one of the supporting parts of the shielding plate includes:
an inserting part of which a lower end is projected; and
a supporting sill which is positioned beside the inserting part and of which a lower end is not projected,
wherein the inserting part is inserted into a fastener formed on the circuit board.

32. The display device of claim 31, wherein the transformer includes a resonant type transformer.

* * * * *